US006051318A

United States Patent [19]

Kwon

[11] Patent Number: 6,051,318

[45] Date of Patent: Apr. 18, 2000

[54] DONOR FILM FOR COLOR FILTER

[75] Inventor: Jang-hyuk Kwon, Suwon, Rep. of Korea

[73] Assignee: Samsung Display Devices Co., Ltd., Kyungki-do, Rep. of Korea

[21] Appl. No.: 09/050,015

[22] Filed: Mar. 30, 1998

[30] Foreign Application Priority Data

May 23, 1997 [KR] Rep. of Korea ...................... 97-20393
Mar. 12, 1998 [KR] Rep. of Korea ........................ 98-8358

[51] Int. Cl.[7] .............................. B41M 5/28; B41M 5/40; B32B 15/08; B32B 27/08; B32B 27/20

[52] U.S. Cl. ....................... 428/413; 428/195; 428/424.4; 428/463; 428/500; 428/520; 428/913; 428/914; 503/227; 430/7; 430/200

[58] Field of Search ................................ 428/413, 424.4, 428/520, 463, 500, 913, 914, 195, 206, 321.3; 526/317.1, 318.4, 318.44; 430/7, 200; 503/227

[56] References Cited

U.S. PATENT DOCUMENTS

| | | | |
|---|---|---|---|
| 3,740,366 | 6/1973 | Sanderson et al. | 524/398 |
| 4,065,523 | 12/1977 | Hutton et al. | 525/289 |

FOREIGN PATENT DOCUMENTS

| | | |
|---|---|---|
| 7281169 | 10/1995 | Japan . |
| 873792 | 3/1996 | Japan . |

*Primary Examiner*—Paul Thibodeau
*Assistant Examiner*—Ramsey Zacharia
*Attorney, Agent, or Firm*—Leydig, Voit & Mayer, Ltd.

[57] ABSTRACT

A donor film for a color filter is provided. The donor film includes a support layer, a light absorbing layer and a transfer layer, wherein the transfer layer comprises an acryl resin represented by the following formula (1) as a bonding resin:

(1)

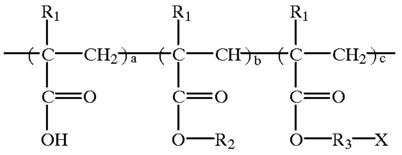

where $R_1$ indicates a hydrogen or methyl group; $R_2$ indicates $C_1$~$C_{12}$ alkyl, $C_2$~$C_{10}$ hydroxyalkyl, substituted or unsubstituted aromatic ring, $C_5$~$C_{10}$ cycloalkyl or benzyl group; $R_3$ indicates $C_1$–$C_{12}$ alkyl, substituted or unsubstituted aromatic ring, $C_5$~$C_{10}$ cycloalkyl or benzyl group; X indicates a vinyl group, epoxy group or hydrogen atom; and $0.1 \leqq a \leqq 0.65$, $0.3 \leqq b \leqq 0.8$ and $0 \leqq c \leqq 0.2$ (Here, a, b and c denote mole fractions, and the sum of a, b and c is 1). According to the manufacturing process of a color filter using a donor film of the present invention, only transfer and curing processes are required for each color, and also the color layers may be cured all at once, if necessary, to thereby largely reduce the number of processes. Thus, the color filter using the donor film is easily manufactured.

14 Claims, 1 Drawing Sheet

DONOR FILM FOR COLOR FILTER

BACKGROUND OF THE INVENTION

The present invention relates to a donor film for a color filter, and more particularly, to a donor film for manufacturing a color filter using thermal transfer method.

A color filter for realizing colors in a liquid crystal display is manufactured by pigment dispersion, printing or electrodeposition.

The pigment dispersion method has a high reproducibility and precision in the process, however, the manufacturing process is too long and complicated. In the printing method, the manufacturing process is simple, however, the color filter manufactured by the printing method is less precise, and the color filter is inappropriate for a large-scale display device. In the electrodeposition method, planarity of the color filter is improved, but, color characteristics are poor.

To solve the above-described problems, the thermal transfer method has been employed for manufacturing the color filter. The thermal transfer method is a dry process in which a donor film including a transfer layer is placed on a substrate, and then a light source such as laser irradiates the donor film to transfer the transfer layer onto the substrate. In the thermal transfer method, much energy is required to transfer the transfer layer, so that a donor film capable of stable and effective transfer is required. The structure of the donor film is usually varied according to the type of transferred substance, physiochemical properties of the transfer layer, and energy source types.

As shown in FIG. 1, the donor film includes a support layer 11, a light absorbing layer 12 for converting absorbed light energy into thermal energy, formed on the support layer, and a transfer layer 13, formed on the light absorbing layer.

We have studied the chemical compositions of the transfer layer and the light absorbing layer of the donor film to complete this invention.

SUMMARY OF THE INVENTION

It is an object of the present invention to provide a donor film for forming a color filter having precision and excellent color characteristics, using a thermal transfer method.

To accomplish the above object of the present invention, there is provided a donor film for a color filter comprising a support layer, a light absorbing layer and a transfer layer, wherein the transfer layer comprises an acryl resin represented by the formula (1) as a bonding resin:

(1)

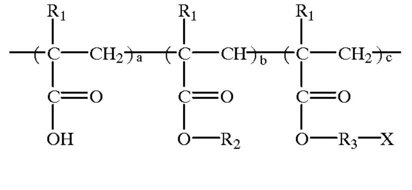

where $R_1$ indicates a hydrogen or methyl group;

$R_2$ indicates $C_1$~$C_{12}$ alkyl, $C_2$~$C_{10}$ hydroxyalkyl, a substituted or unsubstituted aromatic ring, $C_5$~$C_{10}$ cycloalkyl, or a benzyl group;

$R_3$ indicates $C_1$~$C_{12}$ alkyl, a substituted or unsubstituted aromatic ring, $C_5$~$C_{10}$ cycloalkyl, or a benzyl group;

X indicates a vinyl group, an epoxy group; or a hydrogen atom;

$0.1 \leqq a \leqq 0.65$, $0.3 \leqq b \leqq 0.8$ and $0 \leqq c \leqq 0.2$ (Here, a, b, and c denote mole fraction, and the sum of a, b and c is 1).

Preferably, the glass transition temperature of the acryl resin represented by the formula (1) is 30~150° C. If the glass transition temperature of the acryl resin is lower than 30° C., the transfer layer cannot be stably maintained at a room temperature, and if the glass transition temperature is higher than 150° C., much transfer energy is required.

Preferably, the weight the average molecular weight of the acryl resin is $2\times10^3$ to $5\times10^4$ to maintain thermal resistance, transparency and dispersion of the color filter at a desired level.

The basic structure of the donor film including the support layer, the light absorbing layer and the transfer layer may be changed according to required characteristics.

For example, a gas producing layer may be formed between the light absorbing layer and the transfer layer, to increase the photosensitivity of the donor film. The gas producing layer includes a material for producing gas due to thermal energy transmitted from the light absorbing layer. For example, gas can contribute to the transfer of the transfer layer onto a receptor.

One of the materials for producing gas due to thermal energy is a gas producing polymer. The polymer has a thermally decomposable functional group, such as azido, alkylazo, diazo, diazonium, diazirino, nitro, difluoroamino, dinitrofluoromethyl ($CF(NO_2)_2$), cyano, nitrato and triazole groups.

Also, a protective layer may be formed between the transfer layer and the light absorbing layer. The protective layer facilitates separation of the transfer layer from the light absorbing layer, and prevents contamination of the transfer layer by the light absorbing layer. Here, the protective layer is formed of a (meth)acrylate oligomer such as an epoxy methacrylate oligomer, urethane (meth)acrylate oligomer, acryl (meth)acrylate oligomer and ester-(meth)acrylate oligomer, or a mixture of one of the oligomer and (meth) acrylate monomer using a UV-coating method. Also, the protective layer may be formed of an (meth)acrylate monomer using a UV-coating method.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
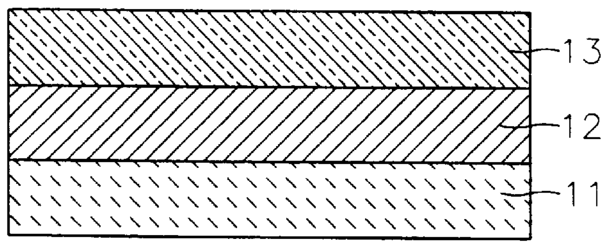
FIG. 1 shows the structure of a general donor film.

The donor film according to the present invention includes a support layer, a light absorbing layer, and a transfer layer, compositions of which will be described hereinbelow.

The support layer supports the other layers, and preferably has light transmittance of 90% or more. The support layer is formed of polyester, polycarbonate, polyolefin, polyvinyl resin, or preferably polyethyleneterephthalate (PET) having high transparency.

Preferably, the thickness of the support layer is in the range of 10~500 μm and may have good transparency and handling. The support layer according to the present invention is formed in a single layer or a multilayer. Also, an antireflection layer may be formed on the support layer to reduce light reflection.

The light absorbing layer is formed on the support layer, supplies transfer energy capable of transferring the transfer layer onto a receptor such as a substrate, and is formed of a material capable of easily absorbing infrared or visible light. The material may include aluminum (Al), tin (Sn), nickel (Ni), titanium (Ti), cobalt (Co), zinc (Zn), lead (Pb), and oxides thereof, which have an optical density of 0.2~3.0. Preferably, aluminum or aluminum oxide is used. Preferably, the light absorbing layer is formed to a thickness of 50~2000 Å using a vacuum evaporation method.

The light absorbing layer may also be formed of a dispersion obtained by dispersing a colorant, such as pigment or dye, and a dispersing agent in a polymer bonding resin. The polymer bonding resin is formed of a (meth) acrylate oligomer such as acryl (meth)acrylate oligomer, ester (meth)acrylate oligomer, epoxy (meth)acrylate oligomer and urethane (meth)acrylate oligomer. Also, the polymer bonding resin may be formed of a mixture of the oligomer and (meth)acrylate monomer, or only (meth) acrylate monomer. The pigment is formed of carbon or graphite having a particle diameter of 0.5 μm or less.

Preferably, the light absorbing layer has an optical density of 0.5~4.0.

As the dispersing agent, a general polymer dispersing agent is used. If the bonding agent acts as a dispersing agent as well, an additional dispersing agent is not required.

A process of forming the light absorbing layer using the composition, obtained by dispersing the colorant such as pigment or dye, and the dispersing agent in the polymer bonding resin will be described as follows.

A photocurable composition may be manufactured by dispersing pigments in a bonding resin such as (meth) acrylate oligomer or (meth)acrylate monomer, and adding a photo initiator thereto. Subsequently, a coating of the photo curable composition is applied to the support layer and cured. The photo curable composition is applied by extrusion, spinning, using a knife or by gravure coating. At this time, it is typical-to simultaneously perform the coating and curing processes. It is preferable that the thickness of the light absorbing layer formed by the above method is 0.1~10 μm.

The transfer layer is formed of a composition including the bonding resin, a cross linking agent, pigments, a dispersing agent, a solvent and additives. Preferably, the a thickness of the transfer layer is 0.5~2.0 μm.

Preferably, the bonding resin for the transfer layer may employ the acrylic resin represented by the formula (1).

A polyfunctional monomer or oligomer is used for the cross linking agent. In detail, the cross linking agent employs the polyfunctional alcohol monomer and/or oligomer such as ethylene glycol, propylene glycol, polyhydric alcohol polyglycol, and polyfunctional acrylate monomer such as ethyleneglycoldi(meth)acrylate, triethyleneglycoldi (meth)acrylate, 1,3-butanedioldi(meth)acrylate, 1-4-cyclohexanedi(meth)acrylate, trimethyloltri(meth)acrylate, trimethylolpropanetri(meth)acrylate, pentaerythritoltri (meth)acrylate, dipentaerythritoltri(meth)acrylate, sorbitoltri(meth)acrylate, sorbitolhexa(meth)acrylate and tetramethylglycoldi(meth)acrylate As the pigment, the usual pigment for a color filter is used. The solvent may include cellosolveacetate, ethylcellosolveacetate, diethyleneglycoldimethylether, ethylbenzene, ethyleneglycoldiethylether, xylene, cyclohexanol, ethylcellosolve, or propyleneglycolmonoethyletheracetate.

Figure 2A:
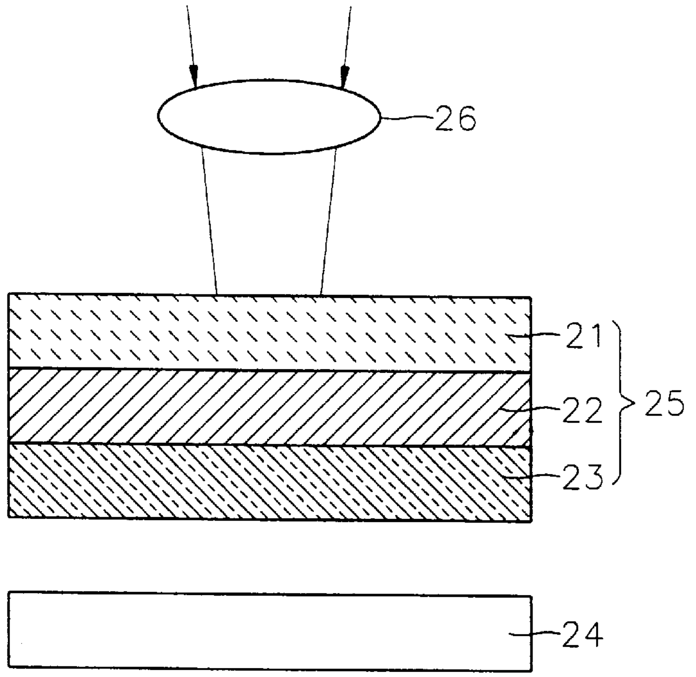
FIGS. 2A and 2B are views illustrating the manufacture of a color filter using a donor film according to the present invention.
Figure 2B:
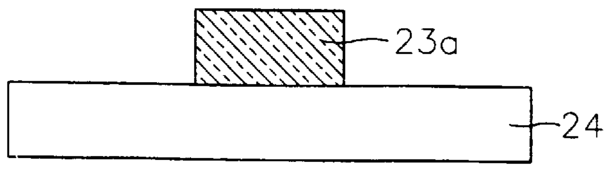

Referring to FIGS. 2A and 2B, the process of forming a color film using a donor film according to the present invention will be described.

The donor film 25 including a support layer 21, a light absorbing layer 22 and a transfer layer 23 is arranged over a substrate 24. Then, energy beam from the energy source is irradiated onto the donor film 25. At this time, a laser beam, xenon lamp or halogen lamp may be used to provide the energy. When the selected energy passes through a transfer device 26 and reaches the support layer 21, heat is emitted from the light absorbing layer 22. Due to the heat, the transfer layer 23 is transferred onto the substrate 24 to form a color filter layer 23*a* as shown in FIG. 2B.

The invention will be described in detail with reference to the following examples, to which the invention is not limited.

(Synthesis example)

Manufacturing acryl resin for transfer layer 25 wt % of Propylene glycol monoethyletheracetate with respect to the total weight of the composition for an acryl resin was added to a mixture of 40 mole % of methacrylic acid and 60 mole % of benzyl methacrylate. 2 wt % of Benzoyl peroxide with respect to the total weight of the composition for acryl resin was added to the resultant mixture, and then the reaction mixture was polymerized at approximately 50° C.

After the polymerization reaction was completed, acryl resin having a weight average molecular weight of $3\times10^4$ was obtained by recrystalization (yield rate: approximately 75%).

EXAMPLE 1

1) Formation of a light absorbing layer

CN-104A80(Sartomer co.) being a mixture of bifunctional epoxyacrylate oligomer and acrylate monomer in a weight ratio of 8:2, carbon black, a mixture of Iragacure 369 (Ciba-geigy co.) and diethylthioxanthone (DETX) (Aldrich co.) in a weight ratio of 7:3, and methylethylketone were mixed in a weight ratio of 20:1:1:21.8, to prepare a composition for the light absorbing layer.

The composition was gravure-coated onto a polyethyleneterephthalate (PET) film having a thickness of approximately 100 μm, and then the film was heat-treated to remove solvents. The resultant structure was irradiated with ultraviolet light to form a light absorbing layer approximately 2~3 μm thick.

2) Formation of a transfer layer

A composition for the transfer layer was prepared by mixing acryl resin manufactured as described in the synthesis example, propylene glycol, a pigment selected from red, green, blue and black matrix pigments, additives and a solvent as shown in Table 1. Here, propyleneglycol monoethyletheracetate was used for the solvent, and the solvent content was four times the total weight of acryl resin, propyleneglycol, pigments and additives.

The composition for the transfer layer was gravure coated onto a PET film having a light absorbing layer. The resultant structure was treated at approximately 80° C., to remove the solvent and form a transfer layer. Therefore, a donor film for a color filter was completed.

TABLE 1

| Object | Red (R) | Green (G) | Blue (B) | Black matrix (BM) |
|---|---|---|---|---|
| acryl resin (wt %) | 37 | 36 | 40 | 58 |
| cross linking agent (wt %) | 18 | 16 | 21 | 27 |
| pigment (wt %) | 40[a] | 43[b] | 34[c] | 10 |
| other additives (wt %) | 5 | 5 | 5 | 5 |

In Table 1, 'a' indicates the pigment obtained by mixing red pigment (Cl red 177) and yellow pigment (Cl yellow 83 or 139) in a weight ratio of 7:3, 'b' indicates the pigment obtained by mixing green pigment (Cl green 36) and yellow pigment (Cl yellow 83 or 139) at 8:2, and 'c' indicates the pigment by mixing blue pigment (Cl blue 15:6) and purple pigment (Cl violet 23) at 9:1.

A glass substrate was cleaned with a cleaning solution (ET-cold, Environmental Tech., U.S.A.), and then ultrasonically treated in deionized water Then, a surface of the glass substrate was UV- and heat-treated to enhance adherence of the glass substrate to a layer to be formed thereon.

Subsequently, a donor film including a PET film, a light absorbing layer and a black matrix transfer layer was placed on the glass substrate. Then, an Nd/YAG laser having a beam size of 30 μm ($1/e^2$) was divided into beams having the same intensities and phases, and the beams were adjusted to the shape of each window and are controlled, to manufacture a black matrix layer having a pattern width of 20 μm.

Then, the black matrix layer was cured at 250° C. for one hour. The substrate where the black matrix layer was formed was cleaned using a cleaning agent (ET-cold, by Environment Tech., U. S. A.), and then ultrasonically treated at 300W in deionized water. Subsequently, the substrate was UV/IR ashing treated.

The donor film for a red color filter was put on the cleaned glass substrate, substrate air bubbles between the substrate and the donor film were removed using a roller. The donor film was scanned using single mode laser beams emitted by an Nd/YAG laser (Quantronic 8W) at a speed of approximately 5 m/sec, to form a striped red color filter pattern. Here, the beam spot size was controlled to 140 μm ($1/e^2$) in the case of VGA, and to 130 μm ($1/e^2$) in the case of SVGA, and the final width of the obtained pattern was 100 μm in the case of VGA, and 90 μm in the case of SVGA.

Subsequently, donor films for the green and blue color filters were used to form striped green and blue color filter patterns, respectively.

The red, green and blue color filter patterns were completed, and then cured at approximately 250° C. for one hour.

EXAMPLE 2

A mixture of methacrylic acid and n-butyl acrylate at 4:6 mole ratio was used instead of acryl resin for the bonding resin for the transfer layer. Otherwise, the procedure was the same as in Example 1.

EXAMPLE 3

A mixture of methacrylic acid and benzyl methacrylate at 1:1 mole ratio was used instead of acryl resin for the bonding resin for the transfer layer.

Otherwise, the procedure was the same as in Example 1.

EXAMPLE 4

A mixture of triethyleneglycoldimethacrylate oligomer and ethylmethacrylate monomer at 6:4 mole ratio was used instead of the mixture of bifunctional epoxyacrylate oligomer and acrylate monomer for the bonding resin for the light absorbing layer. Otherwise, the procedure was the same as in Example 1.

EXAMPLE 5

Black aluminum was deposited onto a PET film having a thickness of approximately 100 μm, to form a light absorbing layer having a thickness of approximately 300 Å. Otherwise, the procedure was the same as in Example 1.

EXAMPLE 6

A protective layer was further formed between the light absorbing layer and the transfer layer as follows. Otherwise, the procedure was the same as in Example 1.

98 g of CN-971A80 (Sartomer co.), which was a mixture of urethane acrylate oligomer and acrylate monomer at 8:2 weight ratio, and 2 g of Iragacure 2959 (Ciba-geigy co.) were completely dissolved in 400 g of propyleneglycol monoethyletheracetate, to prepare a composition for the protective layer. The composition was gravure coated onto the donor film where the light absorbing layer was formed, and then heat-treated to remove the solvent. Then, to the resultant structure was irradiated with UV light to form a protective layer having a thickness of 1~2 μm.

COMPARATIVE EXAMPLE

Red coloring photoresist was coated on a glass substrate, and the substrate was exposed and developed, to form a red color filter pattern. Subsequently, green and blue color filter patterns were formed using green and blue coloring photoresist instead of red coloring photoresist, respectively, on the glass substrate where the red color filter pattern was formed.

Here, Red 6011L, Green 6011L and Blue 6011L of Fuji-Hunt Co. were used for the red coloring photoresist, the green coloring photoresist and the blue coloring photoresist.

The adhesion, chemical-resistance, heat-resistance, light-resistance and color coordinate characteristic of the color filter prepared by the Examples 1–6 and 5 Comparative Example were measured as follows, and the measured results were analyzed. In Table 2, the mean of the results for Examples 1~6 is shown, where each data was a mean value obtained from three or more measurements.

First, the adhesion of each of the red, green and blue color filter layers (thickness: approximately 1.2 μm) was measured by the ASTM D3359-93, X-cut tape test. The result is shown in Table 2.

TABLE 2

| | Red (R) | Green (G) | Blue (B) |
|---|---|---|---|
| Example | 5A | 5A | 5A |
| Comparative Example | 5A | 5A | 5A |

Second, the chemical-resistance of the red, green and blue color filter layers was measured by dipping each color filter layer in a chemical solvents including 5% NaOH, 10% HCl, γ-butyrolactone, N-methylpyrrolidone (NMP), isopropyl alcohol (IPA), acetone and deionized water, at 25° C. for approximately 10 min, and checking for color change of each color filter layer. The result is shown in Table 3. Here, when $\Delta E_{ab}$ is 3 or less, the chemical resistance is interpreted to be good.

TABLE 3

| | | 5% NaOH | 10% HCl | γ-butyrolactone | NMP | IPA | Acetone | Deionized water |
|---|---|---|---|---|---|---|---|---|
| Exp | Red ($\Delta E_{ab}$) | 1.83 | 0.63 | 0.63 | 0.47 | 0.35 | 0.97 | 0.65 |
| | Green ($\Delta E_{ab}$) | 1.86 | 0.59 | 0.55 | 0.58 | 0.50 | 0.58 | 0.85 |
| | Blue ($\Delta E_{ab}$) | 0.43 | 0.35 | 0.82 | 0.35 | 0.78 | 0.23 | 0.49 |
| Com Exp | Red ($\Delta E_{ab}$) | 0.86 | 0.41 | 0.29 | 2.59 | 0.31 | 0.59 | 0.65 |
| | Green ($\Delta E_{ab}$) | 0.72 | 0.51 | 0.89 | 0.47 | 0.27 | 0.67 | 0.58 |
| | Blue ($\Delta E_{ab}$) | 0.15 | 0.65 | 0.29 | 0.52 | 0.34 | 0.56 | 0.65 |

Third, in measuring the heat-resistance of red, green and blue color filter layers, each color filter layer was put in an oven at approximately 250° C. in the $N_2$ atmosphere, for one hour, and then the color change of each color filter layer was checked. The result was shown in Table 4.

TABLE 4

| | Red (R) ($\Delta E_{ab}$) | Green (G) ($\Delta E_{ab}$) | Blue (B) ($\Delta E_{ab}$) |
|---|---|---|---|
| Example | 1.45 | 1.28 | 1.54 |
| Comparative example | 1.25 | 1.45 | 1.36 |

Fourth, the light-resistance of the red, green and blue color filter layers is shown in Table 5. Here, conditions of the light-resistance test were as follows.

Setup: Weather-Ometer Ci65/XW

Temperature: 53~88° C.

Humidity: 20~70% RH

Lamp: Xenon Sunshine Carbon

Time: 250 hours

TABLE 5

| | Red (R) ($\Delta E_{ab}$) | Green (G)($\Delta E_{ab}$) | Blue (B) ($\Delta E_{ab}$) |
|---|---|---|---|
| Example | 1.64 | 0.82 | 2.17 |
| Comparative example | 2.85 | 2.82 | 1.81 |

Fifth, the color coordinate characteristic of the color filter layers was measured by an Olympus Spectrophotometer, as shown in Table 6. Here, a reference sample was a 1737 bare glass from the Corning Co.

TABLE 6

| | | Example | Comparative Example |
|---|---|---|---|
| Color Coordinate | Red (R) | R(1.0 μm)<br>Y: 27.7<br>x: 0.54, y: 0.34 | R(1.0 μm)<br>Y: 27.7<br>x: 0.53, y: 0.34 |
| | Green (G) | G(1.0 μm)<br>Y: 56.6<br>x: 0.32, y: 0.50 | G(1.0 μm)<br>Y: 56.6<br>x: 0.31, y: 0.50 |
| | Blue | B(1.0 μm) | B(1.0 μm) |

TABLE 6-continued

| | Example | Comparative Example |
|---|---|---|
| (B) | Y: 22.1<br>x: 0.15, y: 0.16 | Y: 22.1<br>x: 0.15, y: 0.16 |

As shown in Tables 2–6, the adherence, the chemical-resistance, the heat-resistance, the light-resistance and the color coordinate characteristic of the color filter layer according to the examples were equal to or better than those of the comparative example.

Also, in the above method of manufacturing the color filter according to the examples, the manufacturing process is much shorter and simpler than those of the Comparative Example.

According to the manufacturing process of a color filter using a donor film of the present invention, only transfer and curing processes are required for each color, and also the color layers may be cured all at once, if necessary, to thereby largely reduce the number of processes. Thus, the color filter using the donor film is easily manufactured.

What is claimed is:

1. A donor film for a color filter including a support layer, a light absorbing layer, a protective layer, and a transfer layer, wherein the transfer layer comprises an acryl resin represented by the following formula (1) as a bonding resin:

(1)

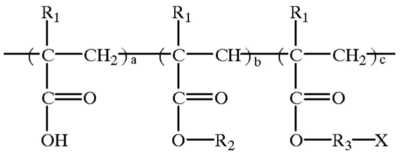

where $R_1$ is a hydrogen or methyl group;

$R_2$ is $C_1$–$C_{12}$ alkyl, $C_2$–$C_{10}$ hydroxyalkyl, a substituted or unsubstituted aromatic ring, $C_5$–$C_{10}$ cycloalkyl, or a benzyl group;

$R_3$ is $C_1$–$C_{12}$ alkyl, a substituted or unsubstituted aromatic ring, $C_5$–$C_{10}$ cycloalkyl, or a benzyl group; and X is a vinyl group, an epoxy group, or a hydrogen atom wherein $0.1 \leqq a \leqq 0.65$, $0.3 \leqq b \leqq 0.8$, and $0 \leqq c \leqq 0.2$, a, b, and c denote mole fractions, and the sum of a, b, and c is 1.

2. The donor film for a color filter according to claim 1, wherein the acryl resin has a glass transition temperature in the range of 30–150° C.

3. The donor film for a color filter according to claim 1, wherein the weight average molecular weight of the acryl resin is $2\times10^3$ to $5\times10^4$.

4. The donor film for a color filter according to claim 1, wherein the light absorbing layer is a dispersion obtained by dispersing a colorant in a bonding resin, wherein the bonding resin is a (meth)acrylate oligomer selected from the group consisting of ester (meth)acrylate oligomer, epoxy (meth)acrylate oligomer, acryl (meth)acrylate oligomer, and urethane (meth)acrylate oligomer.

5. The donor film for a color filter according to claim 4, wherein the bonding resin is a mixture of (meth)acrylate monomer and one compound selected from the group consisting of ester (meth)acrylate oligomer, epoxy (meth) acrylate oligomer, acryl (meth)acrylate oligomer, and urethane (meth)acrylate oligomer.

6. The donor film for a color filter according to claim 4, wherein the bonding resin is a (meth)acrylate monomer.

7. The donor film for a color filter according to claim 1, wherein the light absorbing layer is one metallic material selected from the group consisting of aluminum, tin, nickel, titanium, cobalt, zinc, lead, and oxides thereof.

8. A donor film for a color filter including a support layer, a light absorbing layer, a gas producing layer, and a transfer layer, wherein the transfer layer comprises an acryl resin represented by the following formula (1) as a bonding resin:

(1)

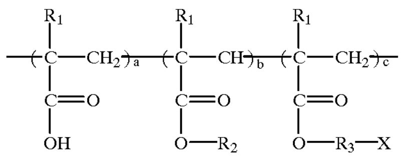

where $R_1$ is a hydrogen or methyl group;

$R_2$ is $C_1$–$C_{12}$ alkyl, $C_2$–$C_{10}$ hydroxyalkyl, a substituted or unsubstituted aromatic ring, $C_5$–$C_{10}$ cycloalkyl, or a benzyl group;

$R_3$ is $C_1$–$C_{12}$ alkyl, a substituted or unsubstituted aromatic ring, $C_5$–$C_{10}$ cycloalkyl, or a benzyl group; and X is a vinyl group, an epoxy group, or a hydrogen atom wherein $0.1 \leqq a \leqq 0.65$, $0.3 \leqq b \leqq 0.8$, and $0 \leqq c \leqq 0.2$, a, b, and c denote mole fractions, and the sum of a, b, and c is 1.

9. The donor film for a color filter according to claim 8, wherein the acryl resin has a glass transition temperature in the range of 30–150° C.

10. The donor film for a color filter according to claim 8, wherein the weight average molecular weight of the acryl resin is $2\times10^3$ to $5\times10^4$.

11. The donor film for a color filter according to claim 8, wherein the light absorbing layer is a dispersion obtained by dispersing a colorant in a bonding resin, wherein the bonding resin is a (meth)acrylate oligomer selected from the group consisting of ester (meth)acrylate oligomer, epoxy (meth)acrylate oligomer, acryl (meth)acrylate oligomer, and urethane (meth)acrylate oligomer.

12. The donor film for a color filter according to claim 11, wherein the bonding resin is a mixture of (meth)acrylate monomer and one compound selected from the group consisting of ester (meth)acrylate oligomer, epoxy (meth) acrylate oligomer, acryl (meth)acrylate oligomer, and urethane (meth)acrylate oligomer.

13. The donor film for a color filter according to claim 11, wherein the bonding resin is a (meth)acrylate monomer.

14. The donor film for a color filter according to claim 8, wherein the light absorbing layer is one metallic material selected from the group consisting of aluminum, tin, nickel, titanium, cobalt, zinc, lead, and oxides thereof.

* * * * *